United States Patent [19]
Porter et al.

[11] Patent Number: 6,077,007
[45] Date of Patent: Jun. 20, 2000

[54] PICK-UP TRUCK BED ORGANIZER AND METHOD

[75] Inventors: Eloise A. Porter, Missouri City, Tex.; Micheal F. Callahan, Broken Arrow, Okla.

[73] Assignee: ELMI Inc., Missouri City, Tex.

[21] Appl. No.: 09/128,504

[22] Filed: Aug. 3, 1998

[51] Int. Cl.[7] ...................................................... B60P 7/15
[52] U.S. Cl. .......................... 410/140; 410/121; 410/129; 410/143
[58] Field of Search ................................. 410/121, 129, 410/140, 143, 144, 145, 139, 142, 151; 296/3; 224/42.33, 403, 404; 211/192; 248/354.5

[56] References Cited

U.S. PATENT DOCUMENTS

| | | |
|---|---|---|
| D. 279,664 | 7/1985 | Waters . |
| 2,919,662 | 1/1960 | Tobin ...................................... 410/142 |
| 3,217,449 | 11/1965 | Levere ................................. 224/403 X |
| 3,704,794 | 12/1972 | Flamm . |
| 4,211,448 | 7/1980 | Weston ...................................... 296/3 |
| 4,236,854 | 12/1980 | Rogers ..................................... 410/121 |
| 4,507,033 | 3/1985 | Boyd ....................................... 410/104 |
| 4,696,507 | 9/1987 | Alldredge . |
| 4,733,898 | 3/1988 | Williams . |
| 4,733,899 | 3/1988 | Keys . |
| 4,737,056 | 4/1988 | Hunt ........................................ 410/151 |
| 4,770,579 | 9/1988 | Aksamit ................................... 410/150 |
| 4,772,165 | 9/1988 | Bartkus .................................... 410/139 |
| 5,137,322 | 8/1992 | Muirhead . |
| 5,143,415 | 9/1992 | Boudah ....................................... 296/3 |
| 5,263,761 | 11/1993 | Hathaway et al. . |
| 5,265,993 | 11/1993 | Wayne ..................................... 410/129 |
| 5,303,969 | 4/1994 | Simnacher . |
| 5,415,506 | 5/1995 | Payne ...................................... 410/129 |
| 5,419,476 | 5/1995 | White . |
| 5,427,486 | 6/1995 | Green ...................................... 410/118 |
| 5,427,487 | 6/1995 | Brosfske ................................. 410/121 |
| 5,439,152 | 8/1995 | Campbell ................................ 296/3 X |
| 5,456,514 | 10/1995 | Justice . |
| 5,494,315 | 2/1996 | Heltenburg . |
| 5,535,931 | 7/1996 | Barlow et al. . |
| 5,564,776 | 10/1996 | Sclachter . |
| 5,567,000 | 10/1996 | Clare . |
| 5,593,201 | 1/1997 | Bateman . |
| 5,657,919 | 8/1997 | Tackett . |
| 5,697,742 | 12/1997 | House ..................................... 410/127 |

FOREIGN PATENT DOCUMENTS

| | | | |
|---|---|---|---|
| 408930A | 1/1991 | European Pat. Off. ............ | 224/42.33 |

*Primary Examiner*—Stephen T. Gordon
*Attorney, Agent, or Firm*—Kenneth L. Nash

[57] ABSTRACT

A pickup truck bed organizer and method is disclosed that comprises tubular elements designed to slip into one another so as to be adjustable in length for mating to virtually all models of pickup trucks. Four, five, and six-way connectors include multiple tubular plugs extending therefrom. Leg members that telescopingly interconnect with the tubular plugs can be combined with the connectors to form a wide variety of different frames for the organizer as desired by the pickup truck operator. Locking members are provided for locking/unlocking the frame of the organizer in the selected configuration. The locking members are operable without the need for tools so that the organizer can be installed and uninstalled without the need for tools. One of many benefits/methods of the organizer is the ability to load cargo in the pickup truck bed directly over the rear wheels so as to use the cargo to increase traction of the pickup truck. Rubber feet are utilized on the feet and arms so as to protect the pickup bed. The system is adjustable and can be added to and taken apart as the need arises.

16 Claims, 5 Drawing Sheets

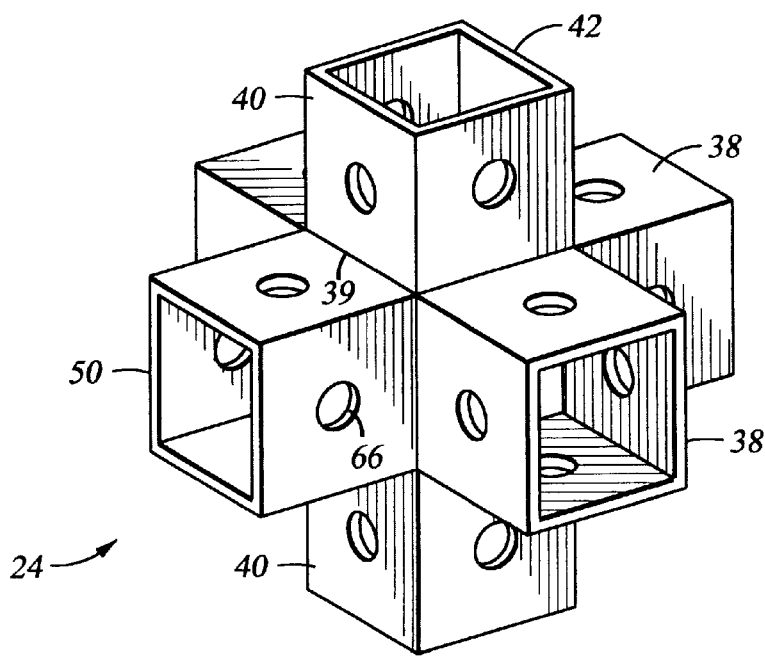
Fig. 6
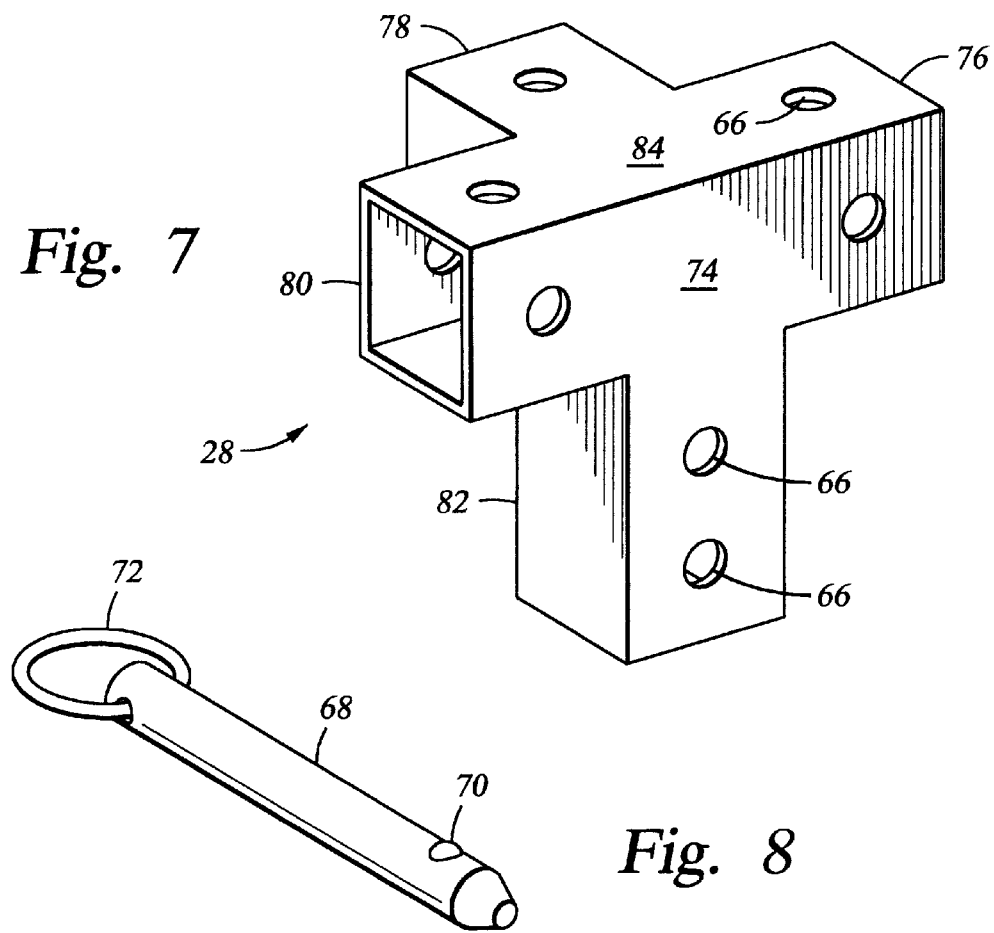
Fig. 7
Fig. 8

PICK-UP TRUCK BED ORGANIZER AND METHOD

BACKGROUND OF THE INVENTION

1. Field of the Invention

The present invention relates generally to pick-up bed cargo organizers and, more particularly, to apparatus and methods for a light-weight, easily installable/removable, and highly configurable pick-up bed organizer.

2. Description of the Background

Pickup trucks have been used for many years as work vehicles and typically have a rectangular open bed. The bed has side walls that permit large objects to be hauled. One basic problem faced by the commercial and personal operators of pickups when hauling cargo is that the forward, side, and stopping movements of the pickup truck causes the cargo to become crushed and scattered. Another problem is that weight distribution and cargo shifting greatly affect vehicle driving characteristics and traction. It is preferable to position the cargo in a desired position but at a minimum it is highly desirable that the weight of the cargo does not shift. Another problem often encountered is that pickup truck drivers normally have to climb on the tire, step or bumper in awkward and potentially physically stressful positions to reach the hauled cargo. It is particularly disadvantageous to be unable to position heavy cargo in a convenient loading/unloading position such as a raised position with respect to the pickup bed. Numerous attempts have been made to solve the above and other problems. However, devices presently available suffer numerous problems including installation/removal difficulty, cargo configuration inflexibility, damage or need to modify some types of truck-beds, significant manufacturing costs, low reliability, difficulty of repair, significant weight, lack of portability, difficulty of use, maintenance problems, and the like.

Some previous attempts to obtain the benefits of a pick-up bed organizer are shown in the following representative patents:

U.S. Pat. No. 5,657,916 issued Aug. 19, 1997 to John Tackett relates to a molded shell with a hinged cover for carrying ballast or other items in pickup truck beds. The shell is designed to fit into the bed of a truck and is formed to fit around the wheel wells. The limitations with this storage unit is that it is bulky and cumbersome. It cannot be easily removed or replaced and limits the usage capabilities of the pickup truck bed. This system probably requires that two people be available for installation and removal.

U.S. Pat. No. 4,733,899 issued Mar. 29, 1988 to Orbrie Keys relates to a portable divider device for dividing the bed of a pickup truck into smaller compartments so that material, such as groceries, deposited in the smaller compartments do not spill all over the bed. The divider device is applicable on trucks with a camper shell of the type that encloses the entire truck bed, leaving only an access door at the rear of the truck which may be opened to place cargo near the tailgate.

U.S. Pat. No. 5,415,506 issued May 16, 1995 to Phillip E. Payne relates to a combination for partitioning a pick-up truck bed. The bed includes a first plurality of vertically disposed channels integrally formed in the first side wall, a second plurality of vertically disposed channels integrally formed in the second side wall and at least one bulkhead member. The bed uses a vertical channel disposed in both the first and second interior wheel houses. The bulkheads are designed to slide into an opposing set of channels.

U.S. Pat. No 5,494,315 issued Feb. 27, 1996 to Boyd Heltenburg relates to a truck bed ballast apparatus that includes a container assembly and a foot assembly adapted for connection to a truck bed. An inlet aperture is located on a wall of the container assembly. A quantity of sand can be added to the container assembly. The container assembly is adapted to be juxtaposed to a fender well projecting upward from the truck adjacent to a side wall of the truck bed. An additional embodiment is revealed. The embodiment utilizes a bracing element between fender wells.

U.S. Pat. No. 4,733,898 issued Mar. 29, 1988 to Scottie Williams relates to a combination storage unit and auxiliary bed liner assembly. The storage unit covers the entire open area of the pickup truck bed, with the space between the auxiliary bed liner and the truck bed being partitioned to provide multiple storage compartments. A top-opening compartment is formed on each side of the two rear wheel well regions. Two pull out drawers located under the liner and between the upper compartments extend the entire length of the pickup truck bed.

U.S. Pat. No. 5,137,322 issued Aug. 11, 1992 to Scott Muirhead relates to a storage compartment in the shape of a rooftop that slopes from the front of the pickup truck bed and extends outward taking up approximately one third of the bed. The chest is hinged for easy access. Extending over the wheel wells are cargo compartments. A liner insert combination is included. The purpose for this invention is to provide the pickup truck driver with a secure place to store cargo.

U.S. Pat. No. 5,303,969 issued Apr. 19, 1994 to Larry W. Simnacher relates to a storage device that is hydraulically maneuvered from a stowed position to a usable position. The storage area is affixed to the sidewall of the pickup truck. It extends the entire length of the pickup truck bed and is approximately 20 inches wide. A hinged door is located on top of the storage unit allowing storage and easy accessibility. A fluid activated lift is attached to the bottom of the storage unit at both ends. The hydraulic system moves cargo from the bottom of the bed to above the side walls.

U.S. Pat. No. 5,535,931 issued Jul. 16, 1996 to John R. Barlow; Russell S. Stephanchick relates to modified storage systems. The storage system includes a compartment defining structure pivotally coupled to the vehicle for movement between a first position wherein the structure straddles and is located over the wheel well and a second position wherein the structure is located adjacent to the wheel well and supported on the floor.

U.S. Pat. No. Des. 279,664 issued Jul. 16, 1985 to John E. Waters relates to an over the wheel well truck tool box.

U.S. Pat. No. 3,704,794 issued Dec. 5, 1972 to James R. Flamm relates to a support deck selectively mountable within a pickup truck bed so as to define an elevated platform over the wheel well covers whereby the full width of the box can be utilized for the accommodation of snowmobiles or the like. The deck, either in its entirety or along the rear portion thereof, slopes downward so as to facilitate the movement of snowmobiles thereon and therefrom. Access to the rear of the deck is provided by means of a removable inclined ramp.

U.S. Pat. No. 5,567,000 issued Oct. 22, 1996 to Scott Clare relates to a hidden storage utility system. The storage system is located adjacent to the wheel well sections of the bed and uses hinges to open and close the side panel of the bed. The storage system does not alter the appearance of the pickup truck. The storage area does not extend inward beyond the wheel wells.

U.S. Pat. No. 5,593,201 issued Jan. 14, 1997 to Nick Bateman relates to a truck tool organizer system including a tuck bed cover that has a top planar portion with a pair of side projections, a front wall, a rear door and a pair of side walls. The rear door has a window centrally positioned therein and a turn handle that extends from a bottom end of the door. Each side wall has a window positioned within. Included is a bottom shell that is positioned within a truck bed and adjacent a pair of wheel wells. The shell has an interior bottom with a pair of front casters attached. The shell receives a drawer that slides. Lastly, included is a center unit. The center unit is positioned in the truck bed and has a floor portion with a pair of tool bins. Each tool bin is positioned above the wheel well of the truck bed with the floor portion as a tool bin base.

U.S. Pat. No. 5,456,514 issued Oct. 10, 1995 to Kendall Justice relates to a pickup truck bed organizer apparatus that includes a layer of flat belting material in which a plurality of panels is defined by a plurality of cuts. Each panel extends between the sides of the material and is pivotable from a down position to an up position. The panels are under tension in their up position due to the inherent properties of the material and return to their down position as part of the layer material when goods which are against them are removed. The panels are pivoted to divide the cargo or bed area of the truck into any of a plurality of separate compartments for organizing goods or cargo or for holding the cargo in any or all of the various compartments.

U.S. Pat. No. 5,427,486 issued Jun. 27, 1995 to Gerald D. Green relates to an adjustable load securing device for securing a partial load in a load carrying area of a vehicle has a rectangular panel of compressible material and at least two spaced, upper and lower elongated members of adjustable length extending across the width of the panel and attached to it. Each elongated member has feet for gripping engagement with opposite side walls of a load carrying area when the elongated member is adjusted in length to fit across the area.

U.S. Pat. No. 5,419,476 issued May 30, 1995 to W. Wyatt White relates to a truck tool box with a locking door plate. The invention has first and second pivoting lids mounted relative to the top wall of the container, with the front wall of the container including a lock plate movable mounted relative to the front wall to effect compartmentalizing of storage below the tool box container relative to the truck bed.

U.S. Pat. No. 5,263,761 issued Nov. 23, 1993 to Richard C. Hathaway et al relates to a modular rail system. The system comprises first and second rail assemblies overlying the top surfaces of the first and second truck bed side walls for releasably connecting with the side walls. A flexible cover overlies the bed covering and providing protection for the bed. A locking mechanism is likewise provided and is associated with the cover and the rail assemblies for lockingly attaching the cover to the rail assemblies and securing the cover in place over the truck bed. The rail system may additionally include a tie down bar, a light bar, a utility box, a camper top, and a single or multi-piece bed liner, each of which is supported and connected to the rail assembly.

U.S. Pat. No. 4,507,033 issued Mar, 26, 1997 to Walter K. Boyd relates to an apparatus for use with a vehicle having an open-topped cargo carrying compartment with first and second side walls which includes first and second elongated side rails attached to the side walls, respectively, and first and second connectors mounted on the first and second side rails respectively, for movement along the associated side rail. The connectors can be locked in position along their associated side rails. First and second retainers are coupled to the first and second connectors respectively for movement with the connectors and the retainers are adapted to extend into the cargo-carrying compartment. Each of the retainers can retain one side of a divider in position within the cargo-carrying compartment.

U.S. Pat. No. 5,564,776 issued Oct. 15, 1996 to Bradley S. Schlachter relates to a storage enclosure for open pickup truck bed. It includes a horizontal top wall extending between the sidewalls and a front wall having a hinged wall portion which may be positioned extending above the deck to form an enclosure space forward of the tailgate when in its closed position. The hinged wall portion may be positioned to extend vertically downwardly from the front wall at its hinge connection to increase the size of the enclosure space defined between the top wall and the load deck, the opposed sidewalls and the tailgate in its closed position. The hinged wall portion may be locked in either working position. The enclosure top wall may be secured to the opposed loadbed sidewalls at stake recesses and the front wall may have opposed recesses to accommodate the loadbed sidewall beam portions. The enclosure is particularly adapted for open loadbed vehicles.

A review of the above patents shows that there remains a need for a light-weight pick-up bed organizer easily installed and configured by a single person without the need for tools. The pick-up bed organizer should be inexpensive, easily removable, be sturdy, highly adaptable, and fit with all models of pick-up trucks. Those skilled in the art have long sought and will appreciate the present invention which addresses these and other problems.

SUMMARY OF THE INVENTION

The organizer and method of the present invention gives the driver a place to put cargo and hold it in place. The organizer of the present invention is adjustable and will fit all or virtually all the pickup truck beds of all models of pickup trucks on the road today. It is portable and easy to assemble and remove. It requires no tools for assembly and disassembly. The organizer of the present invention is economical to fabricate, inexpensive to purchase, and therefore can be made readily available to the average consumer. The organizer of the present invention can be fabricated from a variety of materials: steel, aluminum, plastic, wood, combinations of materials, and the like dependent upon the consumers needs.

An organizer is provided that is suitable for use in a pickup bed or a truck bed generally. The pickup bed typically has a floor and two sides. The organizer comprises a plurality of support legs and a plurality of joints. Each joint has a plurality of preferably tubular plugs extending outwardly therefrom. Each of the plugs is adapted so as to be selectively axially telescopingly interconnectable to one of the plurality of support legs. A plurality of lock members are also provided. The elongate support legs and the plugs are adapted for at least one of the plurality of lock members for fixing a relative axial telescoping position between a respective plug and a corresponding support leg. The joints and legs are interconnectable in numerous different framework configurations depending on how many of the joints, the number of plugs on the joints used, the number of support legs used and their location.

In a presently preferred embodiment, each of the plurality of plugs is oriented at a right angle with respect to at least one other plug. Also in the presently preferred embodiment, the plurality of support members comprises a plurality of vertically oriented legs and a plurality of horizontally oriented legs.

In other words, the organizer comprises a plurality of tubular support members and a plurality of connector elements for selectively axially telescopingly interconnecting with the tubular elongate support members. Each of the plurality of lock members is mountable at a selectable relative axial telescoping position between a tubular elongate support members and one of the connector elements. The tubular elongate support members and connector elements and the lock members are selectively connectable/disconnectable to form any one of a plurality of different framework configurations.

In a presently preferred embodiment, the connector elements comprise a first joint member with six of the plugs, a second joint member with five of the plugs, or a third joint member with four of the plugs. One joint member that may be used has four of the plugs oriented so as to be selectively connectable with up to four tubular support legs substantially oriented in a horizontal direction with respect to the truck bed floor, and two of the plugs is oriented so as to be selectively connectable with up to two support legs substantially oriented in a vertical direction with to the truck bed floor. Another joint member that may preferably be used has four of the plugs oriented so as to be selectively connectable with up to four of the plurality of tubular support legs oriented in substantially a horizontal direction with respect to the truck bed floor and one of the plugs oriented so as to be selectively connectable with one of the plurality of support legs oriented in a substantially vertical direction with respect to the truck bed floor. Another preferably used joint member has three of the plugs oriented so as to be selectively connectable with up to three of the of tubular support legs oriented in a substantially horizontal direction and one of the plugs oriented so as to be selectively connectable with one support legs oriented substantially in a vertical direction with respect to the truck bed floor.

The method for a truck bed organizer comprises providing a plurality of telescoping members comprising with each the telescoping member comprising at least two slidably connected components that fit together telescopingly so as to be adjustable in an overall length for adapting to varying lengths of a plurality of truck beds. Joints are provided that interconnect the telescoping members to form a frame structure. A plurality of lock members are provided for selectively locking/unlocking the overall length of the plurality of telescoping members to thereby fix/unfix the frame structure.

In a one preferred embodiment, a truck bed is provided with slots therein such that the overall length of the plurality of telescoping members is adjustable for mating with the truck bed slots to secure the organizer with respect to the truck bed.

In another preferred embodiment, the truck bed is provided with wheel wells therein such that the overall length of the plurality of telescoping members is adjustable for mating with the truck bed slots to secure the organizer with respect to the truck bed.

In operation, one preferred method is to selectively arrange the organizer within within the truck bed over the rear wheels of the truck and then position the cargo within the organizer to act as weight of the cargo over the set of rear wheels.

In a preferred embodiment, the lock members for selectively locking/unlocking are operable without the need for tools external to the organizer such that the organizer is installable and removable without the need for the tools external to the organizer.

It is an object of the present invention to provide an improved pickup truck bed organizer and method.

It is another object of the present invention to provide an organizer that is adaptable to virtually all pickup beds.

It is yet another object of the present invention to provide an organizer with a compartmentalized rack design that can be customized and adjusted for according to commercial and/or personal desires/needs of the operator.

It is yet another object of the present invention to provide an organizer that is portable, easy to assemble and remove, and can be installed or removed without the need for tools.

A feature of the present invention is joints with multiple tubular elements extending therefrom to allow various configurations.

Another feature of the present invention is support legs that telescopically fit to the tubular elements on the joints so as to be adjustable in length.

Yet another feature of the present invention is a means for locking the telescopically moveable elements in a selected position to provide a sturdy frame.

An advantage of the present invention is a greatly reduced assembly time and manufacturing cost.

Another advantage of the present invention is a wide variety of uses.

Yet another advantage of the present invention is ease of operation.

Yet another advantage of the present invention is that it raises the level of the cargo to make it easy for the operator to reach the cargo.

Yet another advantage of the present invention is that it allows the operator to haul up to quite heavy loads on top of the rack making loading/unloading much easier.

These and other objects, features, and advantages of the present invention will become apparent from the drawings, the descriptions given herein, and the appended claims.

BRIEF DESCRIPTION OF THE DRAWINGS

FIG. 6 is a perspective view of a possible six-way connector in accord with the present invention;

FIG. 7 is a perspective view of a possible four-way connector in accord with the present invention; and FIG. 8 is a lock pin in accord with the present invention.

While the present invention will be described in connection with presently preferred embodiments, it will be understood that it is not intended that the invention is limited to those particular embodiments but the descriptions given herein merely are to provide sufficient information such that one skilled in the art may practice one or more presently preferred embodiments of the invention, in accord with the patent statutes. Thus, the descriptions of the invention provided herein are not intended to limit the invention in any way. On the contrary, it is intended that all alternatives, modifications, and equivalents included within the spirit of the invention and as defined in the appended claims be encompassed as a part of the present invention.

DETAILED DESCRIPTION OF THE PREFERRED EMBODIMENTS

Figure 1:
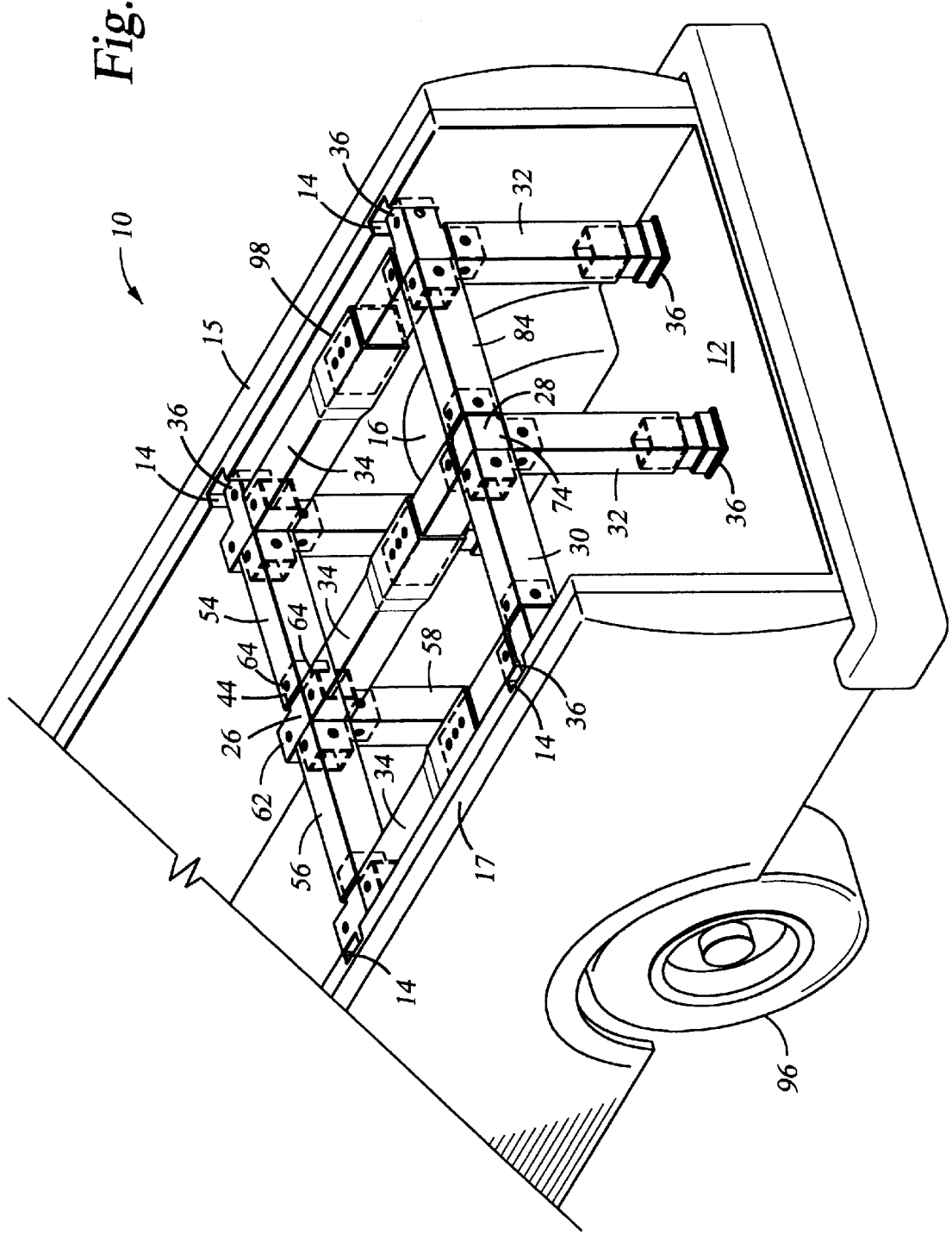
FIG. 1 is a perspective view, partially in section, of a pickup bed organizer in accord with the present invention.

Referring now to the drawings, and more particularly to FIG. 1, where a preferred embodiment of pickup cargo bed organizer 10 in accord with the present invention is illustrated. Bed organizer 10 provides tool free installation/ removal, customized configuration, minimal maintenance, and low cost manufacture. Due to light weight components and a snap-in construction, no tools are required to easily assemble bed organizer 10 or to remove it from the truck bed. As various components can be removed or inserted, numerous different configurations of the shape of bed organizer can be made. Likewise, the configuration can be easily changed at a later date, as desired.

Typical truck bed 12 has a size and generally rectangular shape that varies somewhat depending on the model. The present invention is adaptable to virtually all pickup truck beds. Many truckbeds 12 also have grooves such as grooves 14 in right and left side walls 15 and 17, respectively, that can be used to advantage by organizer 10 of the present invention. However, grooves 14 are not necessary for reliable operation thereof. If desired, organizer 12 can also be solidly braced by wheel well 16 that is present in many pickup beds. Other means of rigidly securing organizer 10 in position make use of front wall 20 and typically hingeable rear wall 18 of the pickup bed as suggested in FIG. 3. It is also possible to include what could be an insert 22 if grooves 14 are not built into the truck bed 12. Item 22 is normally an automobile factory manufactured internal profile for a pickup that includes grooves 14 in convenient places in bed 12. Presently available truck beds often already include grooves 14.

Figure 2:
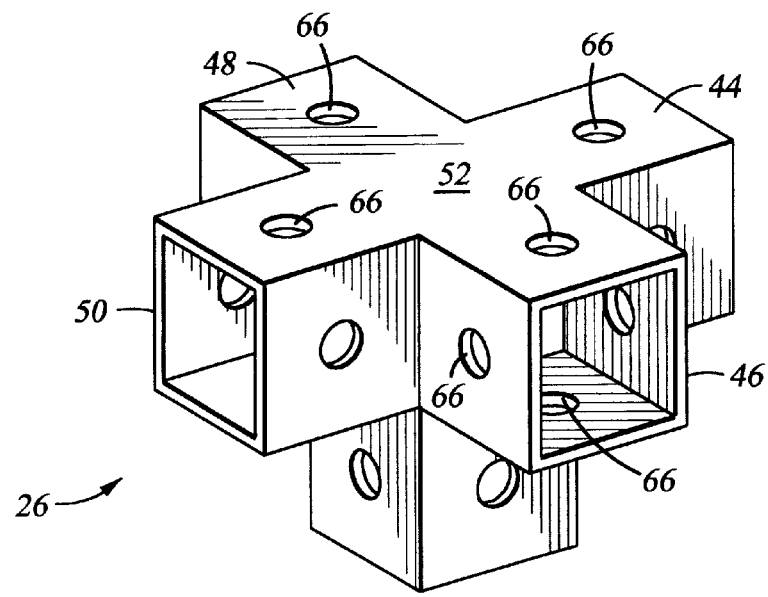
FIG. 2 is a perspective view of a connector for the pickup bed organizer of FIG. 1.

Due to the simplicity of organizer 10, there are preferably only about seven basic building blocks of a presently preferred embodiment of organizer 10. A general overview of these building blocks include components such as six-way connector 24 for which the general shape is most clearly shown in perspective in FIG. 6. Five-way connector 26 is best shown in FIG. 2 and which is also clearly indicated in a configuration of organizer 10 as per FIG. 1. A preferred version of four-way connector 28 is shown in FIG. 7 and is clearly seen to form rear end 30 of organizer 10 in FIG. 1. Vertical support member 32 is shown clearly in FIG. 1 and FIG. 5. Horizontal support member 34 is also clearly shown in FIG. 1 and FIG. 3. Closure caps 36 are made of relatively soft material such as rubber or plastic and used at end regions to protect surfaces of pickup bed 12.

Figure 4:
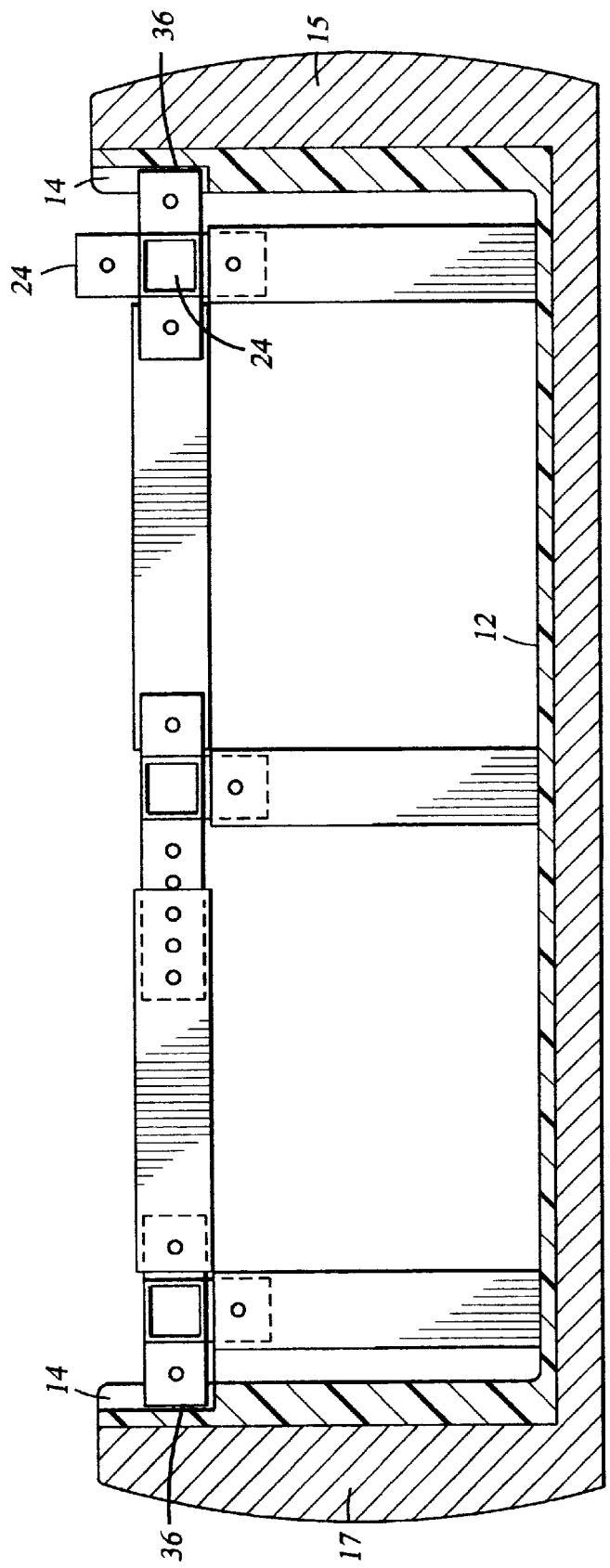
FIG. 4 is an elevational view, in cross-section, of a pick-up wherein support slots are provided in the bed below the top ends of the sides.

Going over the above components in more detail and referring mainly to FIG. 4 and FIG. 6, six-way connector 24 includes four horizontal plugs 38 that are preferably at right angles or orthogonal with respect to each other as shown in FIG. 6. Plugs 38 on opposite sides of center 39 extend in opposite directions from center 39 the four plugs substantially horizontally oriented with respect to the truck bed floor preferably form a right angled cross. Plugs 38 and other plugs discussed hereinafter are preferably tubular members and are designed for telescoping interconnection with other tubular legs or support members. For six-way connector 24 and other connectors discussed subsequently, other angular orientations are possible but for low cost and convenience the present orthogonally oriented configuration is preferred. Six-way connector 24 also includes upper and lower plugs 40 to thereby allow construction of additional loadable layers or where desired for raising the height of the load or part of the load. For six-way connector 24 and other connectors it is desired to have an outer diameter to slide into the struts that are discussed subsequently. A clearance of about one-quarter inch is presently preferred but the clearance is chosen for convenience and could vary somewhat. A presently preferred side is from about $1\!\!\frac{1}{4}$ to $3\!\!\frac{3}{4}$ inches is presently preferred but this could be varied as desired. For light weight and strength, the preferred embodiment of the present invention uses a square cross-section as indicated at 42. However, for particular applications, other cross-section elements could conceivably be used such as for example only a round construction. For instance, for regularly carrying certain types of soft items that might catch on a corner or the like, it might be desirable to have a different cross-section or different material if padding is inconvenient. Therefore, while the presently preferred embodiment would normally use a square cross-section, it is not the intent to limit the present frame construction to square cross-sections or any other particular type of cross-section. Six-way connector 24 preferably also has other features, such as locking elements that may be of various types and which are discussed hereinafter.

Figure 5:
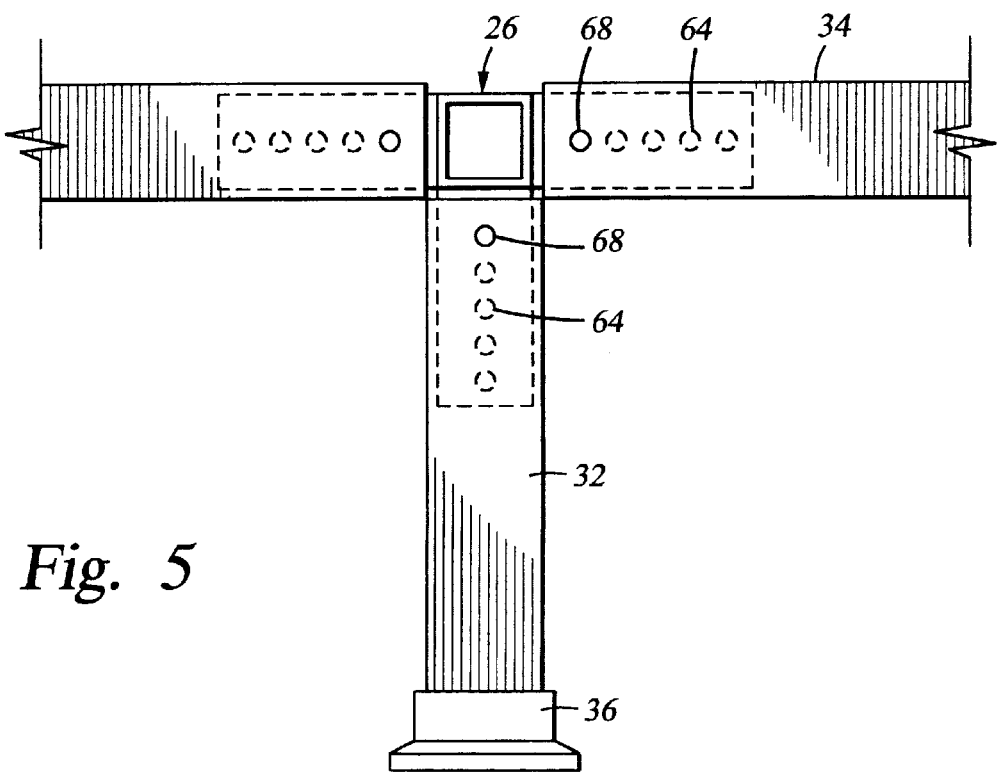
FIG. 5 is an elevational view, partially in section, showing an enlarged view of a possible five-way connector for the pickup bed organizer of the present invention.

In FIG. 1, FIG. 2, and FIG. 5 there is clearly shown five-way connector 26 in accord with a presently preferred embodiment of the present invention. Five-way connector has four plugs 44, 46, 48, and 50 all in the same plane with 46 and 48 being oriented at right angles to 44 and 50. Plug 46 and 48 on opposite sides of center 52 extend in opposite directions from center 52 just as do 44 and 50.

Although discussed mainly with respect to five-way connector or joint 26 it will be understood that all plugs, including those of six-way, five-way, four-way, and any other desired member with a plug preferably have a length adjustment mechanism to adjust to all models of pickup trucks. Accordingly, the plugs thus telescopically extend into legs or support members such as horizontal supports or legs 54, 56, 34, 62 and vertical support or leg 58, shown in FIG. 1. Looking more closely at plug 44 that telescopically extends into horizontal leg 54, a series of in line adjustment holes 64 are shown in horizontal leg 54 preferably on each of the four sides of leg 54. These holes correspond to lengths of standard pick up bed sizes. If desired, they may be marked accordingly. Plugs such as plug 44 preferably have either single holes 66 or a series of holes on each side. The holes preferably extend through at least two opposite sides of plug 44 and preferably through all four sides, as best seen in FIG.2, for mating to the correct size hole in the leg. Holes on opposite sides of the legs and plugs are positioned longitudinally the same as measured from an end so that they correspond and can be engaged simultaneously. A lock pin such as hitch pin 68 of FIG. 8 has a length longer than the side of the leg so as to extend through all the way through upper and lower selected holes in the leg as well as the upper and lower selected holes in the plug. Pin 68 has a spring-loaded ball bearing 70 that holds the pin securely in position until it is desired to remove the pin. A ring 72 or handle is also available for quickly and easily removing pin 68 without the need of tools. Pin 68 could also be a cotter pin or other type of pin that preferably easily resists unintentional removal. Other arrangements could also be used. For instance a shorter pin could be used for locking one hole of a leg to one hole of a plug rather that to two holes of both the plug and leg, as discussed above. As well, item 66 (see FIG. 2) of the plugs could be spring-loaded ball bearings therein for locking with holes in the legs rather than holes. Also, pins such as pin 68 could be used in conjunction with spring-loaded ball-bearings so that two locks are used. Other arrangements could also be used but the result will be telescopingly adjustable plugs on the various types of connectors that telescopingly slide axially with respect to horizontal and vertical legs. Thus, the height and width of organizer 10 can be readily adjusted to form a very sturdy organizer frame that fits virtually all pickup bed sizes, without tools.

A presently preferred four-way connector 28 is shown in FIG. 1 and FIG. 7 that is used as an end member of organizer 10 such that side 74, shown most clearly in FIG. 7, forms an outer end such as rear end 30 of organizer 10 as shown in FIG. 1. Four-way connector 28 has three horizontally oriented plugs 76, 78, and 80 (see FIG. 7) with respect to the truck bed floor as well as one vertically oriented plug 82. Plugs 76 and 80 extend in opposite directions from center portion 84. Plug 78 is preferably at a right angle thereto and side 74 is blank. Vertical plug 82 is orthogonally oriented or at right angles with respect to the other plugs. It will be noted that an example of the possibility of two holes 66 in series is shown on vertical plug 82. Thus, if desired, additional holes 66 may be used on the plugs in series to provide additional length adjustments.

Figure 3:
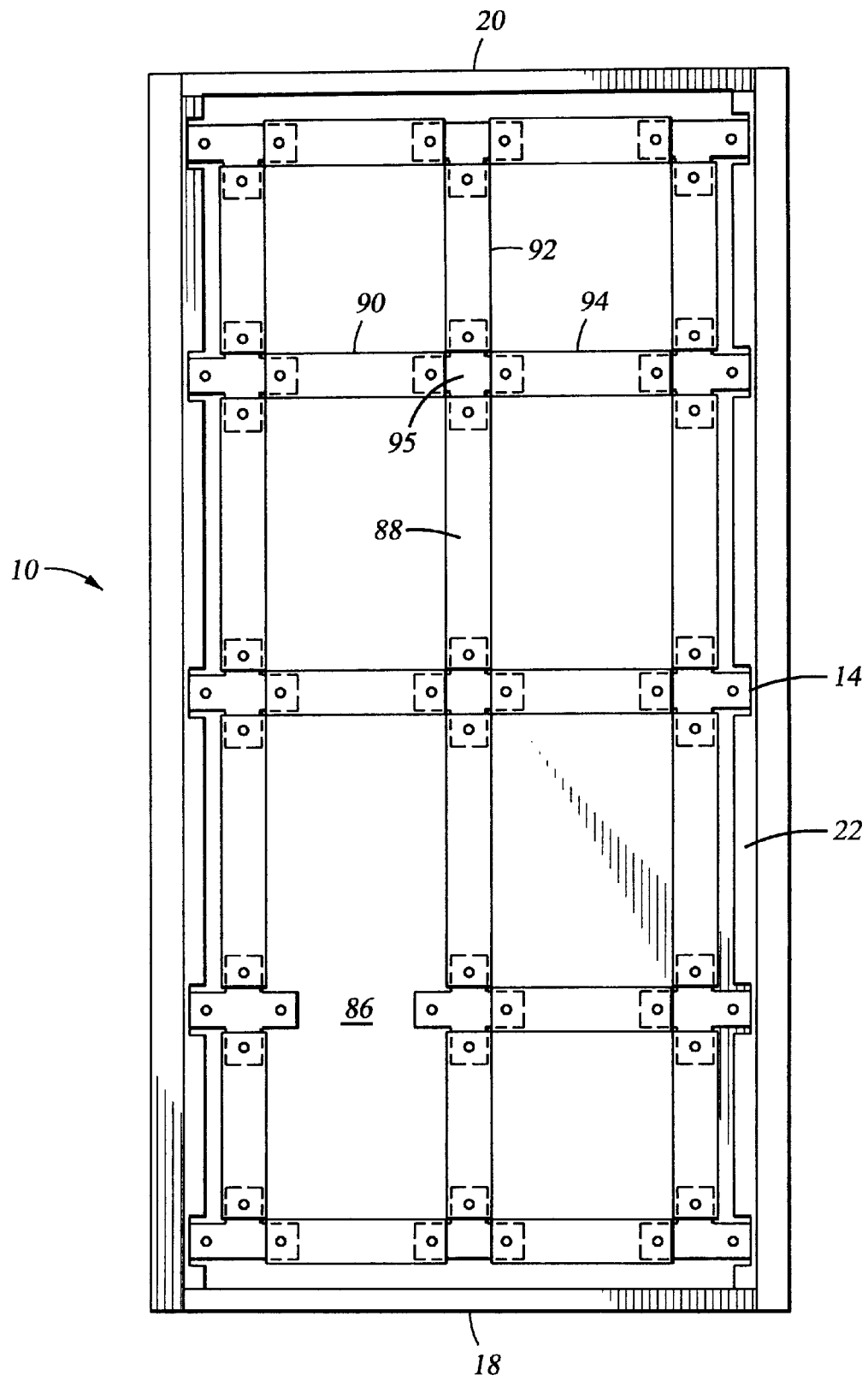
FIG. 3 is a top view, partially in section, of one of many configurations for a pickup bed organizer in accord with the present invention.

Horizontal supports or legs such as horizontal leg 34 of FIG. 5 or leg 84 in FIG. 1 are preferably square cross-sectional tubular legs for mating telescoping, as discussed previously, with the plugs of the connectors. Preferably horizontal legs are of one size or length for the sake of simplicity. In fact, each basic component of the presently preferred embodiment of organizer 10 is of the same size so that there are essentially only seven different basic components of organizer 10. As indicated, each component is a preferably building block that may be used many times thereby lowering manufacturing costs by requiring only seven different components to be made, in a preferred embodiment. As discussed previously, each horizontal support or leg has a series of holes 64 therein that is preferably on each of the four sides. Holes 64 in the legs are then telescopingly aligned with holes 66 of the plugs and ball bearing loaded pins 68 are inserted into the desired holes to provide the desired lengths. The holes may be marked, if desired, for particular models in some manner. As shown in FIG. 3, there are many options on how an organizer is structured so that some horizontal legs may be left out as indicated in volume 86 to thereby form a larger region. Thus, various compartments or different size or shape lattices can be built. For instance, components 88, 90, 92, 94, and 95 could be left out to provide an even larger volume than volume 86. It will be understood that the configuration can be varied widely. For instance, it may be desirable to configure organizer 10 so that volumes are provided over the rear wheels so that all cargo weight goes directly over the rear wheels, such as rear wheel 96. On icy roads or where increased traction is necessary, this procedure can greatly enhance stability of the pickup. In another instance it may be desirable to have an organizer that covers only one portion of the truck bed and does not extend the full length of the pickup bed. In other words, very many configurations can be made with the organizer of the present invention.

Vertical supports or legs such as vertical leg 32 shown in FIG. 1 and FIG. 5 are similar to horizontal legs but may preferably have a different overall length. As discussed above, holes 64 are provided so that vertical heights of organizer 10 can be adjusted. Holes 64 are preferably used on both ends of vertical supports but could be used on only one end, as desired. Vertical heights of a second, third, or desired number of layers of horizontal elements can be adjusted accordingly. Vertical height adjustment may be used to take advantage of slots 14 built into the walls of some pickup beds such as shown in FIG. 4 that may not be located at the upper end of the walls as shown in FIG. 1.

Relatively soft plastic or rubber end caps 36 may be used on ends of vertical members such as FIG. 5 and FIG. 1 are used on the ends of vertical legs 32 and may also be used on the ends of plugs as desired to protect slots 14.

In some cases, it may be desirable to provide extension members, such extension member 98 shown in FIG. 1 for adjustably extending a length between connectors using the same telescoping hole method discussed earlier whereby extension member 98 is telescopingly mountable with respect to longitudinal members. Another possible component might be a four-way connector where all plugs are horizontal and without a vertical plug to avoid the need for a vertical support, if desired. Another possible component might be a common joint member to which the desired number of plugs could be snapped on. Other generally larger in size applications for the present invention include u-haul vans, semi-truck trailers, railroad cars, flat bed trailers, and goose neck trailers. Other generally smaller in size applications include mini-vans, recreational vans, and blazers. In other words, the foregoing disclosure and description of the invention is illustrative and explanatory thereof and provides what the inventors presently consider the best mode of construction and method of the present invention, and it will appreciated by those skilled in the art, that various changes in the size, shape and materials as well as in the details of the illustrated construction or combinations of features of the various elements may be made without departing from the spirit of the invention.

What is claimed is:

1. An organizer suitable for use in a vehicle bed, said vehicle bed having a floor and two sides, said organizer comprising:

a plurality of support legs;

a plurality of joints with each said joint having a plurality of plugs extending outwardly therefrom, each of said plugs being adapted so as to be selectively telescopingly interconnectable to one of said plurality of support legs, at least one joint of said plurality of joints having four plugs for extending horizontally and at least one plug for extending vertically, each of said four plugs and said at least one plug intersecting at a common central intersection, said four horizontal plugs forming a cross such that each of said four horizontal plugs is at a right angle with respect to each adjacent horizontal plug; and a plurality of lock members, said plurality of elongate support legs and said plurality of plugs being adapted for receiving at least one of said plurality of lock members for fixing a relative axial telescoping position between a respective said plug and a corresponding said support leg.

2. The organizer of claim 1, wherein:

said plurality of joints and said legs being interconnectable in numerous different framework configurations depending on how many of said joints, said plugs on said joints, and said support legs are used and located.

3. The organizer of claim 1, wherein:

each of said plurality of plugs is oriented at a right angle with respect to at least one other said plug.

4. The organizer of claim 1, wherein said plurality of support members further comprises:

a plurality of vertically oriented legs; and a plurality of horizontally oriented legs.

5. The organizer of claim 1, wherein:

at least one of said plurality of joints has differing numbers of said plurality of plugs extending outwardly therefrom with respect to at least one other of said plurality of joints.

6. The organizer of claim 1, wherein said plurality of support legs or said plurality of plugs defines a plurality of holes for receiving said plurality of lock members.

7. The organizer of claim 1, wherein said plurality of lock members includes a plurality of lock pins.

8. An organizer suitable for use in a vehicle bed, said vehicle bed having a substantially rectangular floor having a left side wall on a left side of said vehicle and a right side wall on a right side of said vehicle extending upwardly from said floor, said left side wall and said right side wall of said vehicle bed each having a profile, said vehicle bed having a front wall, said organizer comprising:

a plurality of tubular support members;

a plurality of connector elements for selectively axially telescopingly interconnecting with said tubular support members;

a plurality of lock members, each of said plurality of lock members being mountable at a selectable relative axial telescoping position between one of said plurality of tubular support members and one of said plurality of connector elements, said plurality of tubular support members and said plurality of connector elements and said plurality of lock members being selectively connectable/disconnectable to form any one of a plurality of different framework configurations;

a first one of said plurality of support members mountable adjacent said left side wall;

a second one of said plurality of support members mountable adjacent said right side wall;

a third one of said plurality of support members mountable between said first one of said plurality of support members and said second one of said plurality of support members, said third one of said plurality of support members being mountable in a vertical orientation within one of said plurality of different framework configurations and having a length sufficient to engage said floor of said vehicle bed; and at least one of said plurality of connector elements for telescopingly attaching said third one of said plurality of support members within said one of said plurality of different framework configurations, said at least one of said plurality of connector elements having at least three plugs extending outwardly therefrom.

9. The organizer of claim 8, said plurality of connector elements each comprising a joint member from which a plurality of plugs extend outwardly therefrom, each of said plurality of plugs being selectively engageable with one of said plurality of tubular support members.

10. The organizer of claim 8 wherein said plurality of said connector elements comprise a first joint member with six of said plugs extending outwardly from a central portion thereof such that each of said six plugs connects to said central portion, a second joint member with five of said plugs extending outwardly from a central portion thereof such that each of said five plugs connects to said central portion, or a third joint member with four of said plugs extending outwardly from a central portion thereof such that each of said four plugs connects to said central portion.

11. The organizer of claim 8, wherein said plurality of connector elements comprises at least one joint member which has four of said plugs being oriented so as to be selectively connectable with up to four said tubular support members substantially oriented in a horizontal direction with respect to said truck bed floor, and two additional ones of said plugs being oriented so as to be selectively connectable with up to two said support members substantially oriented in a vertical direction with respect to said truck bed floor.

12. The organizer of claim 8, wherein said plurality of connector elements comprises at least one joint member which has four of said plugs oriented so as to be selectively connectable with up to four of said plurality of tubular support members oriented in substantially a horizontal direction with respect to said truck bed floor and at least one additional of said plugs being oriented so as to be selectively connectable with at least one of said plurality of support members oriented in a substantially vertical direction with respect to said truck bed floor each of said four plugs and said at least one additional plug extending outwardly from a central portion thereof such that each of said plugs connects to said central portion.

13. The organizer of claim 8, wherein said plurality of connectors comprises at least one joint member which has three of said plugs oriented so as to be selectively connectable with up to three of said plurality of tubular support members and one of said plugs being oriented so as to be selectively connectable with up to one of said plurality of support oriented substantially in a vertical direction with respect to said truck bed floor.

14. The organizer of claim 8, wherein said plurality of tubular support members and said plurality of connector elements and said plurality of lock members being selectively interconnectable in at least one framework configuration that mates to said profile of said two side walls of said vehicle bed.

15. An organizer suitable for use in a vehicle bed, said vehicle bed having a substantially rectangular floor having a left side wall on a left side of said vehicle and a right side wall on a right side of said vehicle extending upwardly from said floor, said left side wall and said right side wall of said vehicle bed each having a profile, said vehicle bed having a front wall, said organizer comprising:

a plurality of tubular support members;

a plurality of connector elements for selectively axially telescopingly interconnecting with said tubular support members;

a plurality of lock members, each of said plurality of lock members being mountable at a selectable relative axial telescoping position between one of said plurality of tubular support members and one of said plurality of connector elements, said plurality of tubular support members and said plurality of connector elements and said plurality of lock members being selectively connectable/disconnectable to form any one of a plurality of different framework configurations;

a first one of said plurality of support members mountable adjacent said left side wall;

a second one of said plurality of support members mountable adjacent said right side wall;

a third one of said plurality of support members mountable between said first one of said plurality of support members and said second one of said plurality of support members, said third one of said plurality of support members being mountable within one of said plurality of framework configurations in a horizontal orientation so as to be parallel to said left side wall and said right side wall and being supportable above said floor of said vehicle bed; and at least one of said plurality of connector elements for attaching said third one of said plurality of support members to said one of said plurality of framework configurations, said at least one of said plurality of connector elements having at least three plugs extending outwardly from a central portion thereof such that each of said at least three plugs connects to said central portion.

16. The organizer of claim 15, wherein said plurality of connector elements comprises at least one joint member which has four of said plugs oriented so as to be selectively connectable with up to four of said plurality of tubular support members oriented in substantially a horizontal direction with respect to said truck bed floor and at least one additional of said plugs being oriented so as to be selectively connectable with at least one of said plurality of support members oriented in a substantially vertical direction with respect to said truck bed floor each of said four plugs and said at least one additional plug extending outwardly from a central portion thereof such that each of said plugs connects to said central portion.

* * * * *